(12) United States Patent
Nakamura

(10) Patent No.: US 6,815,488 B2
(45) Date of Patent: Nov. 9, 2004

(54) PROCESS FOR PRODUCING THERMOPLASTIC RESIN COMPOSITION

(75) Inventor: Ken Nakamura, Ube (JP)

(73) Assignee: Ube Industries, Ltd., Yamaguchi-ken (JP)

( * ) Notice: Subject to any disclaimer, the term of this patent is extended or adjusted under 35 U.S.C. 154(b) by 0 days.

(21) Appl. No.: 10/097,385

(22) Filed: Mar. 15, 2002

(65) Prior Publication Data

US 2002/0198321 A1 Dec. 26, 2002

(30) Foreign Application Priority Data

Mar. 16, 2001 (JP) ........................ 2001-075265

(51) Int. Cl.$^7$ ................................. C08K 3/34
(52) U.S. Cl. ................. 524/444; 324/445; 324/447; 324/449; 525/92 B; 525/133
(58) Field of Search ............................ 524/444, 445, 524/447, 449; 525/133, 92 B

(56) References Cited

U.S. PATENT DOCUMENTS

| | | | |
|---|---|---|---|
| 3,379,792 A | 4/1968 | Finholt | |
| 3,431,323 A | 3/1969 | Jones | |
| 4,338,421 A | 7/1982 | Maruyama et al. | |
| 5,710,212 A | 1/1998 | Asano et al. | |
| 6,593,411 B2 * | 7/2003 | Koevoets et al. | 524/451 |

FOREIGN PATENT DOCUMENTS

| | | |
|---|---|---|
| EP | 0 751 186 A2 | 1/1997 |
| JP | 45-997 | 1/1970 |
| JP | 56-49753 | 5/1981 |
| JP | 59-66452 | 4/1984 |
| JP | 59-41663 | 10/1984 |
| JP | 61-204262 | 9/1986 |
| JP | 4-372656 | 12/1992 |
| JP | 9-31324 | 2/1997 |

* cited by examiner

*Primary Examiner*—Ana Woodward
(74) *Attorney, Agent, or Firm*—Morgan, Lewis & Bockius LLP

(57) ABSTRACT

A process for producing a thermoplastic resin composition is disclosed and comprises melt-kneading a resin composition containing from 40 to 90 parts by weight of (A) a polyamide resin, from 5 to 50 parts by weight of (B) a polyphenylene ether resin, from 5 to 30 parts by weight of (C) an aromatic vinyl compound-aliphatic hydrocarbon copolymer and from 0 to 30 parts by weight of (D) a polyolefin resin, per 100 parts by weight in total of the components (A), (B), (C) and (D), and further containing from 0.01 to 1.5 parts by weight of (E) an α,β-unsaturated carboxylic acid or a derivative thereof per 100 parts by weight of the component (B), wherein the components (B), (C) and (E) are added from the upstream end of a melt-kneading machine and the component (A) is added part-way through the melt-kneading machine.

6 Claims, 2 Drawing Sheets

PROCESS FOR PRODUCING THERMOPLASTIC RESIN COMPOSITION

BACKGROUND OF THE INVENTION

1. Field of the Invention

The present invention relates to a process for producing a thermoplastic resin composition which is excellent in mechanical properties, moldability, solvent resistance, low water absorptivity and dimensional stability and at the same time, has a low specific gravity (is lightweight) and a superior mold processability. This resin composition is used as a material for motor vehicle parts or electric or electronic parts.

2. Description of Related Art

Crystalline polyamide resins are being widely used as an industrial material because of their strength and high rigidity, however, these resins are known to have high water absorptivity and therefore, suffer from reduction in rigidity, dimensional stability or the like due to water absorption.

Polyarylene ether, and particularly polyphenylene ether, resins are known as an engineering resin having excellent heat resistance, however, these resins are known to suffer from problems when used alone, such as inferior properties in impact resistance, solvent resistance and moldability.

In order to redeem the defects of these two kinds of resins, Japanese Examined Patent Publication (Kokoku) Nos. 45-997 and 59-41663 have proposed to blend a polyamide resin with a polyphenylene ether resin and the thus-obtained resins are practically used. However, the impact resistance of polyphenylene ether is not sufficiently improved in these techniques and a large number of methods for imparting impact resistance by further adding a rubber-like material to these two resins have been proposed as, for example, in Japanese Unexamined Patent Publication (Kokai) Nos. 56-49753 and 61-204262. However, these compositions exhibit poor ability at the mold-processing because of their high melt viscosity and therefore, cannot be used for molded products having a thin wall.

Furthermore, the polyphenylene ether resin and the polyamide resin are substantially incompatible with each other and therefore, for example, a technique of adding an unsaturated carboxylic acid or a derivative thereof disclosed in Japanese Unexamined Patent Publication No. 56-49753 or a technique of using a polyphenylene ether resin previously modified with an unsaturated carboxylic acid or a derivative thereof disclosed in Japanese Unexamined Patent Publication No. 59-66452 is necessary so as to react a polyphenylene ether resin with a polyamide resin.

However, as the polyphenylene ether resin has a high melt viscosity, when a composition is produced by individually adding a polyphenylene ether resin and an unsaturated carboxylic acid, the polyphenylene ether is gelled during melt-kneading due to shearing heat generation, as a result, an appropriate reaction with the unsaturated carboxylic acid does not proceed and the polyphenylene ether cannot be finely dispersed in the polyamide resin matrix.

The method of using a polyphenylene ether resin previously modified with an unsaturated carboxylic acid has a problem in that since the modification of polyphenylene ether and the melt-kneading with polyamide resin are separately performed, the composition costs are high and, therefore, its use is limited.

Other than these, Japanese unexamined Patent Publication No. 4-372656 discloses a method for producing a melt-kneaded composition of a polyamide resin and a polyphenylene ether resin, however, in this method also, the polyamide resin and the polyphenylene ether resin are independently passed through respective melt-kneading processes and then, the polyphenylene ether resin and the polyamide resin are melt-kneaded to form the composition. Accordingly, the above-described problem is still present.

In Japanese Unexamined Patent Publication No. 9-31324, the present inventors have disclosed a composition having a core/shell structure comprising a polyamide resin, a polyphenylene ether resin previously modified with an unsaturated carboxylic acid, an aromatic vinyl compound-aliphatic hydrocarbon copolymer and a polypropylene-base resin. This composition is excellent in mechanical strength, heat resistance, mold processability, dimensional stability and the like. However, as described above, as the modification of polyphenylene ether and the melt-kneading with polyamide resin are separately performed, the composition costs are high and, therefore, its use is limited.

SUMMARY OF THE INVENTION

The present invention has been made to solve the above-described problems in conventional techniques and the object of the present invention is to provide a process for producing a melt-kneaded composition of a polyamide resin and a polyphenylene ether resin, where a resin composition having excellent performance can be industrially produced at a low cost without reducing the mechanical strength and the capabilities, established in conventional techniques, such as processability and dimensional stability.

As a result of extensive investigations to attain this object, the present inventors have found that, in producing a composition by blending a polyamide resin, a polyphenylene ether resin, an aromatic vinyl compound-aliphatic hydrocarbon copolymer and a polyolefin-base resin at a specific ratio, when the polyphenylene ether resin, the aromatic vinyl compound-aliphatic hydrocarbon copolymer and an unsaturated carboxylic acid or a derivative thereof are added from an upstream side of a melt-kneading machine and the polyamide resin is added in the middle of the melt-kneading machine, the composition obtained can solve the above-described problems. The present invention has been accomplished based on this finding.

More specifically, the present invention relates to a process for producing a thermoplastic resin composition, comprising melt-kneading a resin composition containing from 40 to 90 parts by weight of (A) a polyamide resin, from 5 to 50 parts by weight of (B) a polyphenylene ether resin, from 5 to 30 parts by weight of (C) an aromatic vinyl compound-aliphatic hydrocarbon copolymer and from 0 to 30 parts by weight of (D) a polyolefin resin, per 100 parts by weight in total of the components (A), (B), (C) and (D), and further containing from 0.01 to 1.5 parts by weight of (E) an α,β-unsaturated carboxylic acid or a derivative thereof per 100 parts by weight of the component (B), wherein the components (B), (C) and (E) are added from an upstream side of a melt-kneading machine and the component (A) is added in the middle of the melt-kneading machine.

DESCRIPTION OF THE PREFERRED EMBODIMENT

Figure 1:
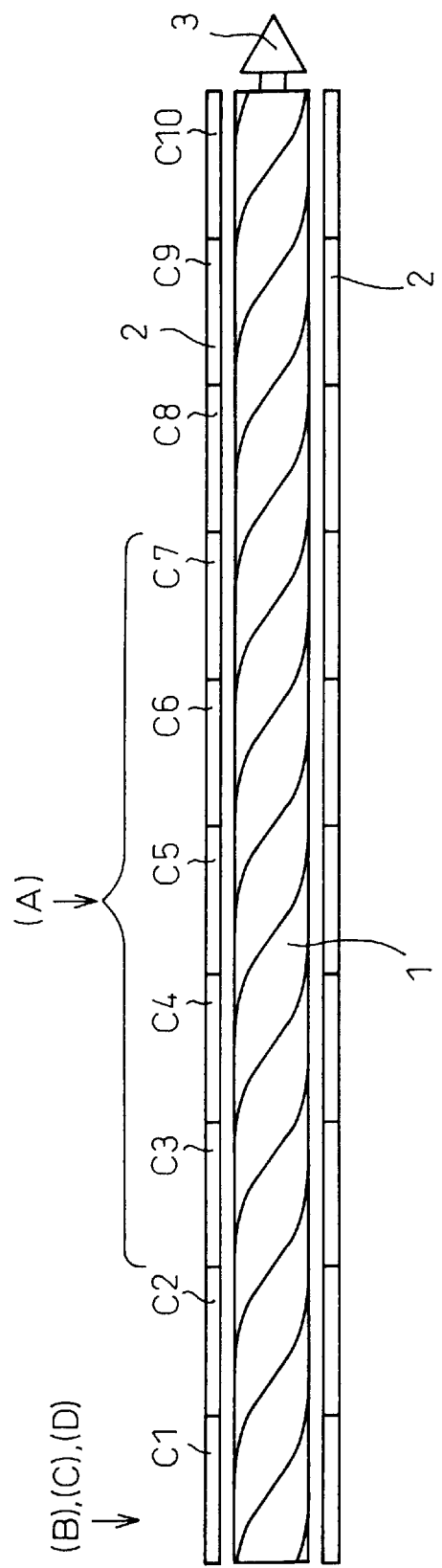
FIG. 1 schematically shows a melt-kneader used in the invention.

The present invention is described in detail below.

The polyamide resin (A) for use in the present invention is an aliphatic polyamide resin comprising an aliphatic diamine and an aliphatic dicarboxylic acid or comprising a lactam or an aminocarboxylic acid, or a partially aromatic copolymerized polyamide resin containing one aromatic monomer component.

In the aliphatic polyamide resin, the monomer components are an aliphatic diamine having from 4 to 12 carbon atoms and an aliphatic dicarboxylic acid having from 6 to 12 carbon atoms, or the monomer component is a lactam having from 6 to 12 carbon atoms or an aminocarboxylic acid having from 6 to 12 carbon atoms. Specific examples of the aliphatic diamine include tetramethylenediamine, hexamethylenediamine, octamethylenediamine, nonamethylenediamine, undecamethylenediamine and dodecamethylenediamine. Specific examples of the aliphatic dicarboxylic acid include adipic acid, heptanedicarboxylic acid, octanedicarboxylic acid, nonanedicarboxylic acid, undecanedicarboxylic acid and dodecanedicarboxylic acid. As for the combination of the aliphatic diamine and the aliphatic dicarboxylic acid, an equimolar salt of hexamethylenediamine with adipic acid is preferred.

Specific examples of the lactam include α-pyrrolidone, ε-caprolactam, ω-laurolactam and ε-enantholactam. Specific examples of the aminocaproic acid include 6-aminocaproic acid, 7-aminoheptanoic acid, 11-aminoundecanoic acid and 12-aminododecanoic acid, with 6-aminocaproic acid, 12-aminododecanoic acid, ε-caprolactam and laurolactam being preferred.

These aliphatic polyamide-forming monomers can be used not only as the one sole component but also in combination of two or more components.

Specific examples of the aliphatic polyamide resin formed of the above-described monomer component(s) include nylon 6, nylon 11, nylon 12, nylon 66, nylon 610, nylon 612 and nylon 116, and these polymers may be a homopolymer or a copolymer of two or more thereof.

The crystalline partially aromatic copolymerized polyamide resin containing one aromatic monomer component is a copolymerized polyamide containing one aromatic monomer component such as aromatic dicarboxylic acid component (e.g., terephthalic acid, isophthalic acid, naphthalenedicarboxylic acid), preferably a crystalline partially aromatic copolymerized polyamide resin containing one aromatic monomer component and having a melting point of 260° C. to less than 320° C., more preferably a crystalline partially aromatic copolymerized polyamide resin containing one aromatic monomer component and having a melting point of 290° C. to less than 316° C.

As for the combination of the crystalline partially aromatic copolymerized polyamide resin containing one aromatic monomer component, the crystalline copolymerized polyamide comprises an equimolar salt of an aliphatic diamine with an aliphatic dicarboxylic acid, an equimolar salt of an aliphatic diamine with an aromatic dicarboxylic acid, and/or an aliphatic polyamide-forming monomer.

The aliphatic diamine is an aliphatic diamine having from 4 to 12 carbon atoms and examples thereof include tetramethylenediamine, hexamethylenediamine, octamethylenediamine, nonamethylenediamine, undecamethylenediamine and dodecamethylenediamine.

The aliphatic dicarboxylic acid is an aliphatic dicarboxylic acid having from 6 to 12 carbon atoms and examples thereof include adipic acid, heptanedicarboxylic acid, octanedicarboxylic acid, nonanedicarboxylic acid, undecanedicarboxylic acid and dodecanedicarboxylic acid.

As for the combination, an equimolar salt of hexamethylenediamine with adipic acid is preferred.

Examples of the aromatic dicarboxylic acid include terephthalic acid, isophthalic acid and naphthalene dicarboxylic acid and, as for the combination, an equimolar salt of hexamethylenediamine with terephthalic acid is preferred.

The aliphatic polyamide-forming monomer is an aminocarboxylic acid having from 6 to 12 carbon atoms or a lactam having from 6 to 12 carbon atoms and examples thereof include 6-aminocaproic acid, 7-aminoheptanoic acid, 11-aminoundecanoic acid, 12-aminododecanoic acid, α-pyrrolidone, ε-caprolactam, laurolactam and ε-enantholactam, with 6-aminocaproic acid, 12-aminododecanoic acid, ε-caprolactam and laurolactam being preferred. These aliphatic polyamide-forming monomers can be used not only as the one sole component but also in a combination of two or more components.

The amounts used are such that the equimolar salt of hexamethylenediamine with adipic acid is from 30 to 70% by weight, the equimolar salt of hexamethylenediamine with terephthalic acid is from 70 to 30% by weight and the aliphatic polyamide-forming monomer is from 0 to 15% by weight, preferably such that the equimolar salt of hexamethylenediamine with adipic acid is from 35 to 55% by weight, the equimolar salt of hexamethylenediamine with terephthalic acid is from 65 to 45% by weight and the aliphatic polyamide-forming monomer is from 0 to 10% by weight.

In the present invention, the polymerization degree of the crystalline polyamide resin is not particularly limited, however, the relative viscosity determined at 25° C. after dissolving 1 g of the polymer in 100 ml of 96% concentrated sulfuric acid is preferably from 1.8 to 5.0, more preferably from 2.0 to 3.0. If the relative viscosity exceeds the upper limit of the numerical value, the processability is remarkably impaired, whereas if it is less than the lower limit, the mechanical strength disadvantageously decreases.

In the present invention, the polyamide resin (A) may further contain from 0.05 to 30% by weight of a layered silicate. Examples of the layered silicate include layered phyllosilicates constructed of layers of magnesium silicate or aluminum silicate.

Specific examples of the layered phyllosilicate include smectite clay minerals such as montmorillonite, saponite, beidellite, nontronite, hectorite and stevensite, as well as vermiculite and halloysite. These may be a natural product or a synthetic product. Among these layered silicates, montmorillonite is preferred.

The layered silicate is preferably in a state uniformly dispersed in the polyamide resin as the component (A). The state that the layered silicate is uniformly dispersed is such a state that when a layered silicate having a one-side length of 0.002 to 1 μm and a thickness of 6 to 20 Å is dispersed in a polyamide resin, the layered silicate is uniformly dispersed while maintaining each interlayer distance of 20 Å or more on average. The interlayer distance as used herein means a distance between the gravitational centers of adjacent plates of the layered silicate, and the uniform dispersion means a state where layered materials each having a structure such that five sheets or less on average of the layered silicate are stacked are dispersed in parallel, at random or in a mixed form thereof and 50% by weight or more, preferably 70% by weight or more of the layered materials are dispersed without locally forming a mass.

In the case where the layered silicate is a multilayer clay mineral, the layered silicate may also be uniformly dispersed by performing the polymerization after contacting the layered silicate with a swelling agent such as amine (e.g., dioctadecylamine, phenylenediamine), amino acid (e.g., 4-amino-n-butyric acid, 12-aminododecanoic acid) or lactams (e.g., ε-caprolactam) to previously expand the space between layers and thereby facilitate the intercalation of monomers between layers. Also, a method of previously expanding the space between layers to 20 Å or more using a swelling agent and then melt-mixing the layered silicate with the polyamide resin or a resin containing the polyamide resin, thereby uniformly dispersing the layered silicate, may be used.

The amount of the layered silicate blended is from 0.05 to 30 parts by weight, preferably from 0.5 to 10 parts by weight, more preferably from 1 to 5 parts by weight, per 100 parts by weight of the polyamide resin. The amount of the layered silicate blended can be varied according to the use end, however, if it exceeds 30 parts by weight, the impact strength is disadvantageously lowered to an extreme extent.

The polyphenylene ether resin (B) for use in the present invention is a polyphenylene ether (hereinafter simply referred to as "PPE") represented by the following formula (I):

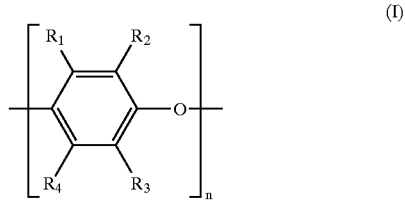

wherein $R_1$, $R_2$, $R_3$ and $R_4$ each represents a monovalent substituent selected from the group consisting of hydrogen, halogen, an alkyl group, an alkoxy group and a haloalkyl or haloalkoxy group having at least two carbon atoms between a halogen atom and the phenyl ring and containing no tertiary α-carbon, $R_1$ to $R_4$ may be the same or different, and n is an integer showing the degree of polymerization.

Specific examples thereof include poly(2,6-dimethyl-1,4-phenylene) ether, poly(2-methyl-6-ethyl-1,4-phenylene) ether and poly(2,6-diethyl-1,4-phenylene) ether.

The aromatic vinyl compound-aliphatic hydrocarbon copolymer (C) for use in the present invention is a hydrogenated or non-hydrogenated styrene/butadiene copolymer, or a hydrogenated or non-hydrogenated styrene/isoprene copolymer. For the hydrogenated or non-hydrogenated styrene/butadiene copolymer, a styrene/butadiene block copolymer, a hydrogenated product of styrene/butadiene block copolymer, or a hydrogenated product of styrene/butadiene random copolymer may be used. For the hydrogenated or non-hydrogenated styrene/isoprene copolymer, a styrene/isoprene block copolymer or a hydrogenated product of styrene/isoprene block copolymer may be used.

The hydrogenated styrene-butadiene copolymer or the hydrogenated styrene-isoprene copolymer may be appropriately selected from those obtained by the hydrogenation according to a known method, for example, the method described in U.S. Pat. No. 3,431,323, and those available on the market.

Examples of the polyolefin resin (D) for use in the present invention include polyethylene-base resin, polypropylene-base resin and ethylene/α-olefin-base resin, such as ethylene/propylene copolymer, ethylene/1-butene copolymer and ethylene/propylene/1,4-hexadiene copolymer.

Among these, polyethylene, polypropylene and ethylene/propylene copolymers are preferred.

In the present invention, (E) an α,β-unsaturated carboxylic acid or a derivative thereof is used as a modifier for compatibilizing the polyphenylene ether resin with the polyamide resin. Specific examples thereof include acrylic acid, methacrylic acid, methyl methacrylic acid, maleic acid, fumaric acid, itaconic acid and citric acid. Examples of the derivative thereof include an acid halide, an amide, an imide, an anhydride, a salt and an ester. Among these, maleic acid, itaconic acid and an anhydride thereof are preferred.

In the present invention, the ratio of respective components blended is preferably such that the polyamide resin as the component (A) is from 40 to 90 parts by weight, preferably from 50 to 80 parts by weight, the polyphenylene ether resin as the component (B) is from 5 to 50 parts by weight, preferably from 5 to 40 parts by weight, the aromatic vinyl compound-aliphatic hydrocarbon copolymer as the component (C) is from 5 to 30 parts by weight, preferably from 5 to 20 parts by weight, and the polyolefin resin as the component (D) is from 0 to 30 parts by weight, preferably from 5 to 15 parts by weight, per 100 parts by weight in total of (A) the polyamide resin, (B) the polyphenylene ether resin, (C) the aromatic vinyl compound-aliphatic hydrocarbon copolymer and (D) the polyolefin-base resin.

The α,β-unsaturated carboxylic acid or a derivative thereof as the component (E) is from 0.01 to 1.5 parts by weight, preferably from 0.1 to 1.0 parts by weight, per 100 parts by weight of the polyphenylene ether resin as the component (B).

In the present invention, the component (A) forms a matrix phase and the components (B), (C) and (D) form a dispersed phase of a core-shell particle structure in which the component (B) forms a shell phase, the component (C) forms an intermediate phase and the component (D) forms a core phase.

In the case of not using the component (D), the component (A) forms a matrix phase and the components (B) and (C) form a dispersed phase of a core-shell particle structure in which the component (B) forms a shell phase and the component (C) forms the core phase.

The production process by which the present invention is characterized is described below.

The composition of the present invention is produced through melt-kneading and preferred examples of the melt-kneading machine include a single or twin screw extruder and a Banbury mixer, with a twin screw extruder being preferred. However, insofar as respective conditions described later are satisfied, the kind of the melt-kneading machine is of course not limited.

In the present invention, at the time of melt-kneading the composition, (B) the polyphenylene ether resin is kneaded with (E) the α,β-unsaturated carboxylic acid or a derivative thereof and (C) the aromatic vinyl compound-aliphatic hydrocarbon copolymer in an upstream portion of a melt-kneading machine set to 190 to 220° C. Then, on the way of the same kneading machine, (A) the polyamide resin is fed and kneaded with (B) the polyphenylene ether resin and the like fed from the upstream side. After the feeding of (A) the polyamide resin, the temperature of the kneading machine is set to approximately from 240 to 350° C., though this temperature varies depending on the kind of polyamide used.

At this time, even if (D) the polyolefin resin which is used depending on the case is fed from the upstream side of the melt-kneading machine, similarly to (B) the polyphenylene ether resin and the like, or fed on the way of the melt-kneading machine, similarly to (A) the polyamide resin, the characteristic features of the present invention are not impaired.

Although it is not restricted, preferably, the length of a melt-kneader is such as to have a L/D (L stands for length and D stands for diameter) of 30 or more. If this ratio is smaller than 30, the melt-kneading of all the components may become insufficient. The length of a portion of a melt-kneader for melt-kneading the components (B), (C) and (D) is preferably such as to have a L/D of 10 to 20. If this portion has a L/D lower than 10, the melting and/or kneading of the components (B), (C) and (D) are not sufficient. If this portion has a L/D larger than 20, the remaining length of a melt-kneader for melt-kneading the components after the component (A) is added may become short, depending on the total length of the kneader. The length of a melt-kneader for melt-kneading the components after the component (A) is added is preferably such as to have a D/L of 10 to 20. If this portion has a L/D lower than 10, the melting and/or kneading of all the components (A), (B), (C) and (D) are not sufficient. If this portion has a L/D larger than 20, the length of a melt-kneader for melt-kneading the components (B), (C) and (D) before the component (A) is added may become short, depending on the total length of the kneader. An example of a preferable construction of a melt-kneader is such that the total length of the kneader corresponds to a L/D of about 35, and the component (A) is added at a portion of a L/D of around 18 from the end where the components (B), (C) and (D) are added. If the initial kneading of the components (B), (C) and (D) or the later kneading of the components (B), (C) and (D) with (A) is insufficient, the resulting product has a poor dispersion or has deteriorated properties.

FIG. 1 shows an example of a melt-kneader in which the reference numeral 1 denotes a kneading screw, 2 an entire barrel, and 3 a nozzle head, and C1 to C10 indicate component barrels, respectively. In the present invention, it is preferable that the component (A) is added at a portion from C3 to C7, more preferably from C4 to C6.

In the present invention, other conditions of the melt-kneading machine, such as rotation number, are not particularly limited.

The resin composition produced by the production process of the present invention can be used by itself as a material for automobile parts or electric or electronic parts, however, function-imparting agents may also be used within the range of not impairing the object, such as heat stabilizer, weathering agent, nucleating agent, crystallization accelerator, mold-release agent, lubricant, antistatic agent, flame retardant, flame retardant aid and coloring agent.

More specifically, examples of the heat stabilizers include hindered phenols, phosphites, thioethers and copper halide. These can be used individually or in combination of two or more thereof.

Examples of the weathering agents include hindered amines and salicylates. These can be used individually or in combination of two or more thereof.

Examples of the nucleating agent include inorganic fillers such as talc and clay, and organic nucleating agents such as fatty acid metal salts. These can be used individually or in combination of two or more thereof.

Examples of the crystallization accelerators include low molecular weight polyamides, higher fatty acids, higher fatty acid esters and higher aliphatic alcohols. These can be used individually or in combination of two or more thereof.

Examples of the mold-release agents include fatty acid metal salts, fatty acid amides and various waxes. These can be used individually or in combination of two or more thereof.

Examples of the antistatic agents include aliphatic alcohols, aliphatic alcohol esters and higher fatty acid esters. These can be used individually or in combination of two or more thereof.

Examples of the flame retardants include metal hydroxides such as magnesium hydroxide, phosphorus, ammonium phosphate, ammonium polyphosphate, melamine cyanurate, ethylenedimelamine dicyanurate, potassium nitrate, brominated epoxy compounds, brominated polycarbonate compounds, brominated polystyrene compounds, tetrabromobenzyl polyacrylate, tribromophenol polycondensates, polybromobiphenyl ethers and chlorine-base flame retardants. These can be used individually or in combination of two or more thereof.

The resin composition of the present invention may contain other thermoplastic resin compositions within the range of not impairing the object of the present invention. Examples thereof include general-purpose resin materials (e.g., polystyrene, ABS resin, AS resin, acrylic resin), aliphatic polyamide resins other than (A) for use in the present invention, polycarbonate, polyethylene terephthalate, polybutylene terephthalate, polyphenylene sulfide and other highly heat-resistant resins.

In the resin composition of the present invention, an inorganic or organic fibrous filler, a spherical filler or a plate-like filler may be used within the range of not impairing the object of the present invention.

Examples of the filler which can be used include fibrous reinforcing agents such as glass fiber, carbon fiber and stainless steel fiber, plate-like fillers such as talc, mica and montmorillonite, whisker fillers such as wollastonite, and spherical fillers such as glass beads.

The method for blending these function-imparting agent (e.g., heat stabilizer, weathering agent, nucleating agent, crystallization accelerator, mold-release agent, lubricant, antistatic agent, flame retardant, flame retardant aid, coloring agent), thermoplastic resin, filler and reinforcing agent is not particularly limited insofar as the object of the present invention is not impaired.

The composition of the present invention can be used for engines, transmissions, differential mechanism parts, chassis parts, exterior parts, interior parts, electrical equipment parts and electric/electronic parts of motor vehicles, two-wheelers and the like.

EXAMPLES

The present invention is described in greater detail below by referring to Examples and Comparative Examples, however, the present invention is not limited thereto.

In Examples and Comparative Examples, the physical properties of the molded article were measured as follows.

[Evaluation of Physical Properties]

(Evaluation of Mechanical Properties)

The evaluation was performed on the following items under the conditions shown below. The evaluations all were performed in a dry state.

(1) Tensile Strength and Elongation

These were evaluated in accordance with ASTMD 638 using a No. 1 specimen having a thickness of 3.2 mm at a pulling rate of 5 mm/min.

(2) Flexural Strength and Flexural Modulus

These were evaluated in accordance with ASTMD 790 by a three-point bending test using a strip specimen having a thickness of 3.2 mm.

(3) Impact Strength

This was evaluated in accordance with ASTMD 256A by an Izod impact tester using a strip specimen having a thickness of 3.2 mm, which was notched by the after-work.

(4) Deflection Temperature under Load (DTUL)

This was evaluated in accordance with ASTMD 648 using a strip specimen having a thickness of 12.7 mm under a load of 455 KPa.

(Evaluation of Moldability)

(5) Flow Length

Using a spiral mold for measuring the flow length of a 12.5 mm-width and 1 mm-thick bar, the flow length was measured at a resin temperature of 280° C. and mold temperature of 80° C. under an injection pressure of 50 MPa in an injection molding machine SG75 manufactured by Sumitomo Heavy Industries, Ltd.

(Confirmation of Dispersed State)

The dispersibility was confirmed using a transmission electron microscope. The coloring was performed using ruthenium tetroxide and osmic acid.

In Examples and Comparative Examples, the following raw materials were used.

Component (A), Polyamide Resin:

Polyamide A:

Polyamide 6 resin (1015B, produced by Ube Industries, Ltd.) having a number average molecular weight of 15,000.

Polyamide B:

Polyamide 6 resin (1015C2, produced by Ube Industries Ltd.) having a number average molecular weight of 15,000 and containing 2% by weight of a layered silicate, where one unit of the layered silicate had a one-side length of 0.002 to 1 $\mu$m and a thickness of 6 to 20 Å and these units were uniformly dispersed while keeping each interlayer distance of 20 Å or more on average.

Polyamide C:

Polyamide 66 resin having a number average molecular weight of 20,000 (2020B, produced by Ube Industries Ltd.).

Component (B), Polyphenylene Ether Resin:

PPE (1):

Poly(2,6-dimethyl-1,4-phenylene ether) resin having a relative viscosity of 0.45 in a chloroform solution at 25° C.

PPE (2):

Maleic anhydride-modified polyphenylene ether resin obtained by melt-kneading the polyphenylene ether as PPE (1) and maleic anhydride at 280° C. (the amount of maleic anhydride in the resin determined using a previously prepared calibration curve on an infrared absorption spectrum was 0.2%).

Component (C), Aromatic Vinyl Compound-Aliphatic Hydrocarbon Copolymer:

(1) Hydrogenated styrene-isoprene block copolymer (hereinafter, simply referred to as SEPS (1); SEPTON 2104 produced by Kuraray Co., Ltd.)

Component (D), Polyolefin-Type Resin:

(1) Homopolypropylene resin having an MFR of 0.8 g/10 min at 230° C. under a load of 2.16 kg (hereinafter, simply referred to as PP (1)).

Component (E), $\alpha,\beta$-Unsaturated Carboxylic Acid:

(1) Maleic anhydride (guaranteed reagent; hereinafter, simply referred to as MAH).

Example 1

As the constituent components of a thermoplastic resin composition, 55 parts by weight of Polyamide A, 25 parts by weight of PPE (1), 15 parts by weight of SEPS (1), 5 parts by weight of PP (1) and 0.2 parts by weight of MAH were used.

Using a same-direction co-rotating twin screw extruder TEX44HCT manufactured by Japan Steel Works, Ltd., PPE (1), MAH and SEPS (1) which were previously mixed each in a predetermined amount were charged from the barrel C1 and Polyamide A and PP (1) which were previously mixed were charged from the barrel C6. The extruder had ten component barrels C1 to C10 in the direction from the upstream to the nozzle head as shown in FIG. 1.

A predetermined composition was melt-kneaded and pelletized under the conditions such that the barrel temperature was 200° C. at C1 to C5 and 260° C. from C6 to the nozzle head, the rotation number of screw was 150 rpm and the total discharge amount was 40 kg/hr.

The obtained pellets of the composition were dried at 110° C. for 12 hours in a vacuum and then injection-molded into respective specimens at a cylinder temperature of 270° C., a mold temperature of 80° C. and an injection rate of 70 ml/sec using an injection molding machine SG75 manufactured by Sumitomo Heavy Industries, Ltd.

The thus-obtained samples were confirmed on the mechanical strength and the dispersed state by the above-described methods. The results are shown in Table 1.

Examples 2 and 3

The tests were performed in the same manner as in Example 1 except that Polyamide B or Polyamide C was used in place of Polyamide A. The results and the compositions are shown in Table 1.

Example 4

The test was performed in the same manner as in Example 1 except that as the constituent components of the thermoplastic resin composition, 75 parts by weight of Polyamide A, 5 parts by weight of PPE (1), 10 parts by weight of SEPS (1), 10 parts by weight of PP (1) and 0.04 parts by weight of MAH were used.

Example 5

The test was performed in the same manner as in Example 1 except that as the constituent components of the thermoplastic resin composition, 45 parts by weight of Polyamide A, 40 parts by weight of PPE (1), 10 parts by weight of SEPS (1), 5 parts by weight of PP (1) and 0.4 parts by weight of MAH were used.

Comparative Example 1

As the constituent components of the thermoplastic resin composition, 55 parts by weight of Polyamide A, 25 parts by weight of PPE (1), 15 parts by weight of SEPS (1), 5 parts by weight of PP (1) and 0.2 parts by weight of MAH were used.

The test was performed in the same manner as in Example 1 except for using a co-rotating twin extruder TEX44HCT, manufactured by Japan Steel Works, Ltd., and that the PPE (1) and MAH, which were previously mixed each in a predetermined amount, were charged from the barrel C1, and Polyamide A, SEPS (1) and PP (1), which were previously mixed, were charged from the barrel C6.

Comparative Example 2

As the constituent components of the thermoplastic resin composition, 55 parts by weight of Polyamide A, 25 parts by weight of PPE (1), 15 parts by weight of SEPS (1), 5 parts by weight of PP (1) and 0.2 parts by weight of MAH were used.

Using a same-direction co-rotating twin screw extruder TEX44HCT manufactured by Japan Steel Works, Ltd., all components, which were previously mixed each in a predetermined amount, were charged from the barrel C1.

The test was performed in the same manner as in Example 1 except that a predetermined composition was melt-kneaded and pelletized under conditions such that the barrel temperature was 260° C. from C1 to the nozzle head, the rotation number of screw was 150 rpm and the total discharge amount was 40 kg/hr.

Comparative Example 3

The test was performed in the same manner as in Comparative Example 1 except for using Polyamide C in place of Polyamide A.

Comparative Example 4

The test was performed in the same manner as in Comparative Example 2 except that as the constituent components of the thermoplastic resin composition, 55 parts by weight of Polyamide A, 25 parts by weight of PPE (2), 15 parts by weight of SEPS (1) and 5 parts by weight of PP (1) were used.

Comparative Example 5

The test was performed in the same manner as in Example 1 except that MAH was not used as a constituent component of the thermoplastic resin composition.

Comparative Example 6

The test was performed in the same manner as in Example 1 except that the temperature of the barrel of the melt-kneader from C1 to the nozzle head was 260° C.

Figure 2:
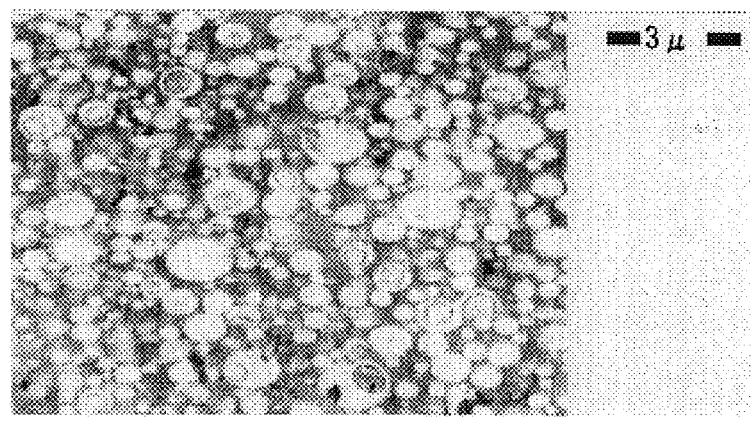
FIG. 2 is a photograph from a transmission electron microscope as a view showing the dispersed state of the sample obtained in Example 1.
Figure 3:
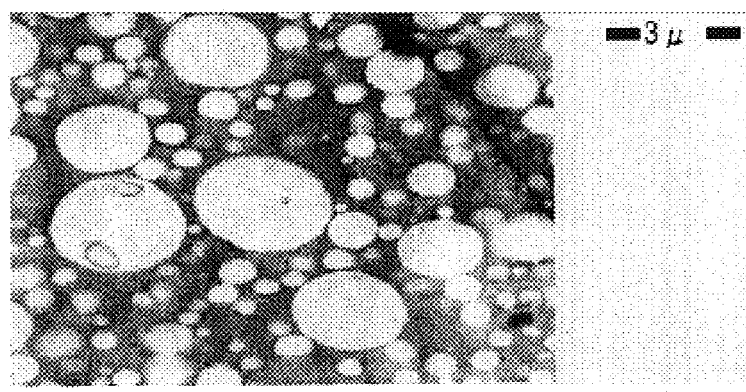
FIG. 3 is a photograph from a transmission electron microscope as a view showing the dispersed state of the sample obtained in Comparative Example 1.
Figure 4:
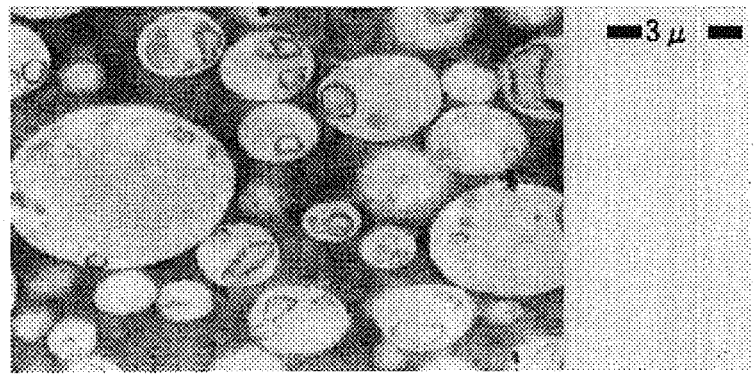
FIG. 4 is a photograph from a transmission electron microscope as a view showing the dispersed state of the sample obtained in Comparative Example 5.

The dispersed states of the samples obtained in Example 1, Comparative Example 1 and Comparative Example 5 were observed by TEM and are shown in FIGS. 2 to 4, respectively.

TABLE 1

|  |  | Example 1 | Example 2 | Example 3 | Example 4 | Example 5 |
|---|---|---|---|---|---|---|
| Polyamide A (parts by weight) |  | 55 |  |  | 75 | 45 |
| Polyamide B (parts by weight) |  |  | 55 |  |  |  |
| Polyamide C (parts by weight) |  |  |  | 55 |  |  |
| PPE (1) (parts by weight) |  | 25 | 25 | 25 | 5 | 40 |
| PPE (2) (parts by weight) |  |  |  |  |  |  |
| SEPS (parts by weight) |  | 15 | 15 | 15 | 10 | 10 |
| PP (parts by weight) |  | 5 | 5 | 5 | 10 | 5 |
| MAH (parts by weight) |  | 0.2 | 0.2 | 0.2 | 0.04 | 0.4 |
| Tensile Yield Strength | MPa | 55 | 67 | 60 | 65 | 65 |
| Tensile Elongation at Break | % | 200 | 140 | 65 | 200 | 160 |
| Flexural Strength | MPa | 85 | 93 | 90 | 95 | 98 |
| Flexural Modulus | MPa | 2,200 | 2,400 | 2,300 | 2,000 | 2,400 |
| Izod Impact Strength | J/m | 320 | 190 | 200 | 250 | 300 |
| DTUL | ° C. | 160 | 175 | 180 | 140 | 170 |
| Moldability (fluidity) | mm | 100 | 95 | 80 | 110 | 80 |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Polyamide A (parts by weight) |  | 55 | 55 |  | 55 | 55 | 55 |
| Polyamide B (parts by weight) |  |  |  |  |  |  |  |
| Polyamide C (parts by weight) |  |  |  | 55 |  |  |  |
| PPE (1) (parts by weight) |  | 25 | 25 | 25 |  | 25 | 25 |
| PPE (2) (parts by weight) |  |  |  |  | 25 |  |  |
| SEPS (parts by weight) |  | 15 | 15 | 15 | 15 | 15 | 15 |
| PP (parts by weight) |  | 5 | 5 | 5 | 5 | 5 | 5 |
| MAH (parts by weight) |  | 0.2 | 0.2 | 0.2 | — | — | 0.2 |
| Tensile Yield Strength | MPa | 55 | 59 | 60 | 55 | 60 | 57 |

TABLE 2-continued

| | | Comparative Example 1 | Comparative Example 2 | Comparative Example 3 | Comparative Example 4 | Comparative Example 5 | Comparative Example 6 |
|---|---|---|---|---|---|---|---|
| Tensile Elongation at Break | % | 5 | 20 | 4 | 4 | 100 | 5.5 |
| Flexural Strength | MPa | 88 | 90 | 90 | 97 | 80 | 90 |
| Flexural Modulus | MPa | 2,100 | 2,200 | 2,400 | 2,200 | 2,100 | 2,400 |
| Izod Impact Strength | J/m | 30 | 80 | 25 | 33 | 180 | 41 |
| DTUL | ° C. | 140 | 150 | 160 | 143 | 140 | 165 |
| Moldability (fluidity) | mm | 61 | 73 | 110 | 81 | 77 | 57 |

(Effects of the Invention)

As described in the foregoing pages, the composition produced according to the production process of the present invention has an excellent balance in mechanical properties, heat resistance and impact resistance and can be used in many fields such as motor vehicle parts, electric or electronic parts, and machine parts.

What is claimed is:

1. A process for producing a thermoplastic resin composition, comprising melt-kneading a resin composition containing from 40 to 90 parts by weight of (A) a polyamide resins;

from 5 to 50 parts by weight of (B) a polyphenylene ether resins;

from 5 to 30 parts by weight of (C) an aromatic vinyl compound-aliphatic hydrocarbon copolymer;

from 0 to 30 parts by weight of (D) a polyolefin resin, per 100 parts by weight in total of said components (A), (B), (C) and (D), and further containing from 0.01 to 1.5 parts by weight of (E) an $\alpha,\beta$-unsaturated carboxylic acid or a derivative thereof per 100 parts by weight to said component (B), wherein said components (B), (C) and (E) are introduced added from an upstream side of a melt-kneading machine and said component (A) is introduced at an intermediate point of the melt-kneading machine, said components (B) (C) and (E) being kneaded at a temperature of 190–220° C. on the upstream side of the kneading machine and, then, said components (B), (C) and (E) to together with said component (A) being kneaded at a temperature of 240–350° C.

2. The process for producing a thermoplastic resin composition as claimed in claim 1, wherein said components (B), (C), (D) and (E) are added from an upstream end of a melt-kneading machine.

3. The process for producing a thermoplastic resin composition as claimed in claim 1, wherein said polyamide resin as the component (A) is an aliphatic polyamide resin comprising an aliphatic diamine and an aliphatic dicarboxylic acid or comprising a lactam or an aminocarboxylic acid.

4. The process for producing a thermoplastic resin composition as claimed in claim 1, wherein said polyamide resin as the component (A) is a partially aromatic copolymerized polyamide resin containing one aromatic monomer component.

5. The process for producing a thermoplastic resin composition as claimed in claim 1, wherein said polyamide resin as the component (A) is a polyamide resin containing from 0.05 to 30% by weight of a layered silicate.

6. The process for producing a thermoplastic resin composition as claimed in claim 1, wherein said component (A) forms a matrix phase and said components (B), (C) and (D) provide a dispersed phase having a core/shell particle structure such that said component (B) forms a shell phase, said component (C) forms an intermediate phase and said component (D) forms a core phase.

* * * * *